United States Patent
Ghamsari et al.

(10) Patent No.: US 11,900,433 B2
(45) Date of Patent: Feb. 13, 2024

(54) SYSTEMS AND METHODS FOR UPDATING LISTINGS

(71) Applicant: Capital One Services, LLC, McLean, VA (US)

(72) Inventors: Avid Ghamsari, Frisco, TX (US); Staevan Duckworth, Oak Point, TX (US); Geoffrey Dagley, McKinney, TX (US); Micah Price, The Colony, TX (US); Qiaochu Tang, Frisco, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 404 days.

(21) Appl. No.: 16/917,985

(22) Filed: Jul. 1, 2020

(65) Prior Publication Data
US 2021/0233141 A1    Jul. 29, 2021

Related U.S. Application Data

(63) Continuation of application No. 16/774,356, filed on Jan. 28, 2020, now Pat. No. 10,706,452.

(51) Int. Cl.
*G06Q 30/00* (2023.01)
*G06Q 30/0601* (2023.01)
(Continued)

(52) U.S. Cl.
CPC ....... *G06Q 30/0627* (2013.01); *G06F 16/958* (2019.01); *G06N 20/00* (2019.01)

(58) Field of Classification Search
CPC ... G06Q 30/0627; G06F 16/958; G06N 20/00
See application file for complete search history.

(56) References Cited

U.S. PATENT DOCUMENTS 7,921,052 B2    4/2011   Dabney et al.
8,855,712 B2   10/2014   Lord et al.
(Continued)

OTHER PUBLICATIONS

Wang, Yi, et al. "Smartphoto: a resource-aware crowdsourcing approach for image sensing with smartphones." Proceedings of the 15th ACM international symposium on mobile ad hoc networking and computing. (Year: 2014).*

(Continued)

*Primary Examiner* — Matthew E Zimmerman
(74) *Attorney, Agent, or Firm* — Finnegan, Henderson, Farabow, Garrett & Dunner LLP

(57) ABSTRACT

The present disclosure provides systems and methods for creating and updating vehicle listings using crowdsourced images. An exemplary embodiment of the disclosed systems and methods includes at least one processor and at least one non-transitory computer-readable medium containing instructions. The instructions, when executed by the at least one processor, cause the system to perform operations. The operations include communicating with a listing system to create a listing for a vehicle and receiving, from an identification application executing on a mobile device distinct from the listing system, an identifier for the vehicle and an image of the vehicle. The operations further include identifying the listing using the received identifier, determining one or more parameters associated with an image quality for the received image, and updating the listing for the vehicle to include the received image based on the determined one or more parameters for the received image.

18 Claims, 5 Drawing Sheets

(51) Int. Cl.
*G06F 16/958* (2019.01)
*G06N 20/00* (2019.01)

(56) References Cited

U.S. PATENT DOCUMENTS

| | | | | |
|---|---|---|---|---|
| 9,152,990 | B1* | 10/2015 | Kanter | G06Q 30/0609 |
| 9,886,845 | B2 | 2/2018 | Rhoads et al. | |
| 10,140,553 | B1* | 11/2018 | Vasisht | G06V 20/20 |
| 10,437,507 | B2* | 10/2019 | Tormasov | G06F 3/065 |
| 11,010,827 | B1* | 5/2021 | Latronico | G06Q 40/03 |
| 11,232,511 | B1* | 1/2022 | Zehr | G06V 20/70 |
| 2002/0107761 | A1* | 8/2002 | Kark | G06Q 10/06 707/999.009 |
| 2007/0124216 | A1 | 5/2007 | Lucas | |
| 2009/0237546 | A1 | 9/2009 | Bloebaum et al. | |
| 2011/0295658 | A1 | 12/2011 | Bastos et al. | |
| 2013/0036043 | A1* | 2/2013 | Faith | G06Q 30/0639 382/305 |
| 2014/0278998 | A1* | 9/2014 | Systrom | G06Q 30/0277 705/14.57 |
| 2016/0335692 | A1 | 11/2016 | Yamartino et al. | |
| 2017/0286372 | A1* | 10/2017 | Chellam | G06F 3/04842 |
| 2018/0137087 | A1* | 5/2018 | Chakraborty | G06F 3/0482 |

OTHER PUBLICATIONS

Ouaknine, "Review of Deep Learning Algorithms for Image Semantic Segmentation," https://medium com/@arthur_ouaknine/review-of-deep-learning-algorithms-for-image-semantic- segmentation-509a600f7b57 (2018).

Rosebrock, "Blur detection with OpenCV," pyimagesearch, https://www.pvimagesearch.com/2015/09/07/blur-detection-with-opencv/ (2015).

https://web.archive.org/web20190707153233/https:getaawp.com/blog/version-3-7-download-product-images-host-them-locally/ (Year: 2019).

* cited by examiner

SYSTEMS AND METHODS FOR UPDATING LISTINGS

This application claims priority to U.S. application Ser. No. 16/774,356, filed on Jan. 28, 2020, the content of which is expressly incorporated herein by reference in its entirety.

TECHNICAL FIELD

The disclosed embodiments generally relate to using vehicle identification technologies to identify attributes of a vehicle. More particularly, the disclosed embodiments relate to using vehicle identification technologies to extract features and attributes of a vehicle and use crowdsourced images to generate accurate vehicle listings.

BACKGROUND

Users often search on online platforms for vehicles they are interested in. Vehicle listings posted by dealerships can provide the users with an overview of the listed vehicle. Some listings include information about various attributes of the vehicle, such as the model, make, year, color, or mileage. However, many vehicle listings are not accurate or updated. For example, some listings do not include any vehicle image, or do not include images of the listed vehicle that accurately represent the current conditions of the vehicle. The users may need to visit the dealership to locate and view the vehicle, or may have to conduct additional search to view similar vehicles. This and other problems exist with inaccurate vehicle listings.

SUMMARY

The disclosed embodiments include methods, devices, and systems for generating accurate vehicle listings from crowdsourced images using vehicle identification technologies.

The disclosed embodiments include a system. The system can include at least one processor and at least one non-transitory computer-readable medium containing instructions. When executed by the at least one processor, the instructions can cause the system to perform operations. The operations can include communicating with a listing system to create a listing for a vehicle. The operations can further include receiving, from an identification application executing on a mobile device distinct from the listing system, an identifier for the vehicle and an image of the vehicle. The operations can further include identifying the listing using the received identifier. The operations can further include determining one or more parameters associated with an image quality for the received image. The operations can further include updating the listing for the vehicle to include the received image based on the determined one or more parameters for the received image.

The disclosed embodiments include another system. This system can include at least one processor and at least one non-transitory computer-readable medium containing instructions. When executed by the at least one processor, the instructions can cause the system to perform operations. The operations can include receiving, from an identification application executing on a mobile device distinct from the listing system, an identifier for a vehicle and an image of the vehicle. The operations can further include identifying a listing of the vehicle in a listing system using the received identifier. The operations can further include determining whether the listing satisfies an image update criterion. The operations can further include updating the listing for the vehicle to include the received image based on satisfaction of the image update criterion.

The disclosed embodiments include another system. This system can include a mobile device and a provider system. The mobile device can be configured to acquire an image of an item, generate an identifier for the item using the acquired image, and provide an identifier for the item and the acquired image to the provider system. The provider system can be configured to receive listing data for the item from a listing system distinct from the mobile device. The provider system can further be configured to receive the identifier for the item and the acquired image from the mobile device. The provider system can further be configured to determine one or more parameters associated with an image quality for the acquired image. The provider system can further be configured to associate the acquired image with the listing data based on the determined one or more parameters for the acquired image and the received identifier.

It is to be understood that both the foregoing general description and the following detailed description are exemplary and explanatory only and are not restrictive of the disclosed embodiments, as claimed.

BRIEF DESCRIPTION OF THE DRAWINGS

The drawings are not necessarily to scale or exhaustive. Instead, emphasis is generally placed upon illustrating the principles of the embodiments described herein. The accompanying drawings, which are incorporated in and constitute a part of this specification, illustrate several embodiments consistent with the disclosure and, together with the description, serve to explain the principles of the disclosure. In the drawings.

DETAILED DESCRIPTION

Figure 1:
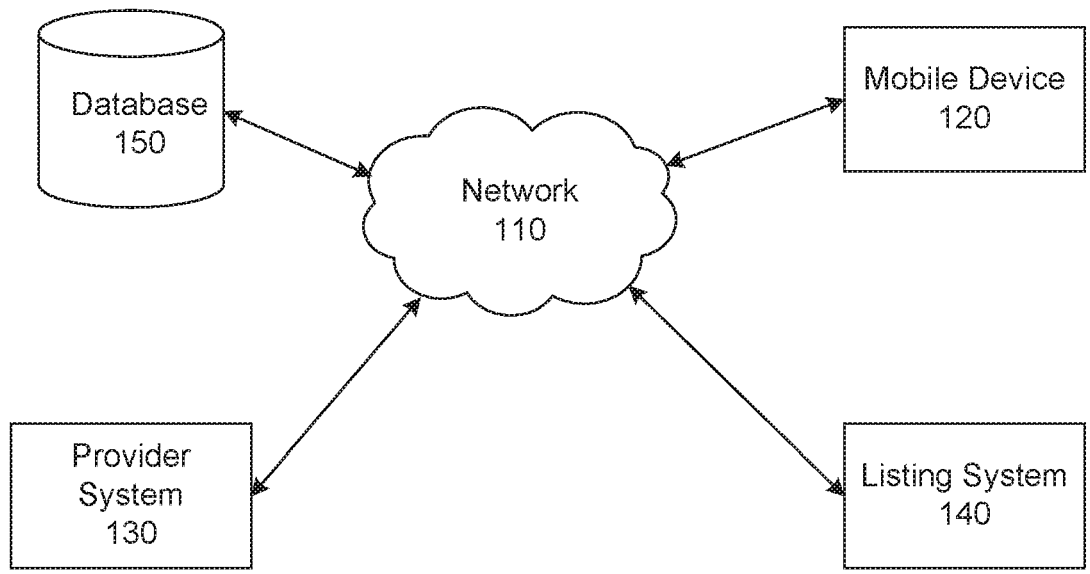
FIG. 1 depicts a schematic of an exemplary system for automatically collecting and processing crowdsourced images to create vehicle listings, consistent with disclosed embodiments.

Reference will now be made in detail to exemplary embodiments, discussed with regards to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. Thus the materials, methods, and examples are illustrative only and are not intended to be necessarily limiting.

Auto dealerships may list available vehicles in their inventory on a web platform or through a downloadable application. The listings can include one or more attributes of the vehicle, such as the model, color, make, trim, year, body style, etc. The listings may further include information about other features of the vehicle and historical usage of the vehicle, such as engine type, fuel type, transmission type, and mileage. The listings may also include pricing information, the availability date of the vehicle, address and contact information of the dealership, and website and inventory information of the dealership. When a user is shopping for a vehicle, a user can search online based on the attributes or features of the vehicle they are interested in, and view listings of available vehicles matching their desired attributes or features.

Vehicle images, if included in the listings, can help a user assess vehicle features and conditions by allowing the user to view the vehicle. In this manner, the actual images of the vehicle can help the user efficiently narrow her search and make a purchase decision. But dealerships sometimes fail to provide an image or may provide an inaccurate image. For example, some dealerships simply provide stock images, which may not actually reflect the features and conditions of the listed vehicle. Some listings include images of other vehicles that are of a different color, trim, model, or year. Some listings may also include images that do not present a complete image of the vehicle or include obstructions, such as images including advertisements of the dealership overlaying or obstructing parts of the vehicle.

Vehicle listings including inaccurate images can harm users and dealerships. An inaccurate image may cause a user to visit a dealership to inspect an undesired vehicle, wasting the time and attention of the user. The user may not purchase the undesired vehicle and may develop a negative impression of the web platform, downloadable application, or dealership. Apart from the resulting reduction in sales and negative impression, dealerships may be further harmed when users cannot locate vehicles that do match their requirements. In addition, users are more likely to visit the dealership if the online listings are accurate and include actual images of the listed vehicles.

Although users and dealerships may benefit from listings including images of the listed vehicles, dealerships may be unable or unwilling to provide such images. A dealership may have thousands of new and used vehicles in inventory. Obtaining high-quality images for each listing and matching these images to each vehicle may be infeasible.

The disclosed embodiments may address the above problems by collecting crowdsourced images of vehicles and associating these images with corresponding listings for the vehicles. In some embodiments, the images can be incidentally collected by a vehicle identification application operating on a mobile device of the user. For example, a user can capture an image of the vehicle using the mobile device and application in order to receive information about the vehicle. The application can then automatically provide one or more images of the vehicle for association with the listing. In this manner, the vehicle listings can be automatically updated with accurate vehicle images without requiring the dealership provide accurate images for each listing.

In some embodiments, a vehicle listing provider system can communicate with listing systems of one or more dealerships to create a plurality of vehicle listings. In some embodiments, the vehicle listing provider system may be associated with a particular dealership. For example, the provider system can be a vehicle listing management platform associated with a pool of vehicles corresponding to the inventory of that dealership. The vehicle listing provider system can be configured to create or update vehicle listings using crowdsourced images. The vehicle listings can be posted on the dealership's website or shared with another platform associated with the dealership.

In some embodiments, the provider system can be or include a vehicle listing management platform associated with an aggregated pool of vehicles corresponding to the inventories of a plurality of dealerships. The provider system can be configured to create and/or update the vehicle listings. The provider system can create the vehicle listings using existing listing information obtained from the dealership listing systems. The existing listing information may or may not include images of the listed vehicle.

In some embodiments, listings created by the vehicle listing provider system can be displayed on a web platform or downloadable application, such as the CAPITAL ONE® AUTO NAVIGATOR® platform, or the like. In various embodiments, the provider system can further provide individual dealerships with vehicle listings for those dealerships. Such listings can be displayed on a web page associated with the dealership or stored in an internal system associated with the dealership.

In some embodiments, the provider system may receive an image of a vehicle from a user mobile device. The provider system may also receive an identifier of the vehicle. The image can be obtained by the camera of the mobile device. For example, the image may be automatically obtained from the mobile device when the user uses a vehicle identification application running on the mobile device to obtain information about the vehicle (e.g., while the user is walking around the lot of a dealership where the vehicle is located). In some embodiments, the image can be automatically transmitted to the provider system without input or instruction from the user.

The provider system can identify an existing listing based on the received identifier. The provider system can analyze the received image and determine a quality score (which may depend on one or more parameters associated with image quality, such as focus, contrast, obstructions, brightness, blurriness, distortions, color accuracy, etc.) for the image. Based on the quality score of the received image, the provider system may update the existing listing of the vehicle with the received image. In this manner, the automatically provided image of the vehicle can be used to supplement the existing listing with an actual image which accurately reflects the recent or current conditions of the vehicle. The updated listing can then be made available for display on the web platform or through the downloadable application. In some embodiments, the updated listing can be provided to the dealership and can be reflected on the dealership's listing system. When the listing is subsequently viewed by other users, it presents the users with an actual image of the listed vehicle, which facilitates the user's vehicle search and purchase process. Further, location or time stamps can be added to the added vehicle image or to the vehicle listing, to inform the users where and when the image was taken, or when the listing was last updated.

Consistent with disclosed embodiments, crowdsourced vehicle images can be transmitted to a provider system, which can use the received images to update or supplement existing vehicle listings. In this manner, a vehicle listing can be updated to accurately reflect the features and current conditions of the vehicle. Users can benefit from the accurate representation of the vehicle, as they are less likely to waste time and energy pursuing vehicles that do not interest them. Dealerships can benefit from the efficient generation and updating of vehicle listings, as accurate listings may increase customer satisfaction and customer visits to the dealerships. Furthermore, the dealerships can realize this benefit without having to expend resources to create high-quality images of the actual vehicles. To further illustrate the technical solutions disclosed herein and the advantages thereof, exemplary embodiments are described below with reference to the accompanying drawings.

FIG. 1 depicts a schematic of an exemplary system 100 for automatically collecting and processing crowdsourced images to create vehicle listings, consistent with disclosed embodiments. As shown in FIG. 1, system 100 can include network 110, mobile device(s) 120, provider system 130, listing system 140, and database 150. These components may communicate with each other, or with other systems, using network 110. Provider system 130 can obtain existing vehicle listing information from listing system 140, and create updated listings for storage in database 150 using data received from mobile device 120.

Network 110 facilitates communication and sharing of information between mobile devices 120, provider system 130, and listing system 140. Network 140 may be any type of network that provides communications, exchanges information, and/or facilitates the exchange of information. For example, network 110 may be the Internet, a Local Area Network, a cellular network, a public switched telephone network ("PSTN"), or other suitable connection(s) that enables transmission of information between the components of system 100. Network 110 may support a variety of electronic messaging formats and may further support a variety of services and applications for mobile devices 120.

Additionally or alternatively, network 110 may include a direct communication network. Direct communications may use any suitable technologies, including, for example, BLUETOOTH™, BLUETOOTH LE™ (BLE), Wi-Fi, near field communications (NFC), or other suitable communication methods that provide a medium for transmitting data between separate devices. In some embodiments, mobile device 120 and provider system 130 may connect and communicate through a direct communications network.

Mobile device 120 may include a smart phone, a tablet, a smart watch or other wearable computing device, a computer monitor, an in-vehicle touch screen display device, and a laptop computer. Mobile device 120 may include video/audio input devices such as a video camera, a web camera, a microphone or the like. Mobile device 120 may also include one or more software applications that enable the user devices to engage in communications, such as IM, text messages, email, VoIP, and video conferences, with one another and with provider system 130. For example, mobile device 120 can capture one or more images (e.g., a still image or frames of video data) of a vehicle using a camera component of mobile device 120 or an associated imaging device. The one or more images of the vehicle can be processed by an identification application of mobile device 120 to identify attributes and/or generate an identifier for the vehicle using, for example, image analysis or object recognition techniques. Such processing can be performed by mobile device 120 and can occur during or after capture of the one or more images. In some instances, mobile device 120 can transmit the one or more images to provider system 130 for identification of attributes and/or generation of an identifier for the vehicle. In various instances, identification of attributes and/or generation of an identifier can be performed at least in part on mobile device 120 and at least in part on provider system 130.

Provider system 130 can be configured to create and update vehicle listings. In some embodiments, provider system 130 can be configured to display vehicle listings (e.g., using a web site or through a downloadable application). Provider system 130 can be configured to obtain vehicle information from existing listings of one or more dealership listing systems and create listings with the existing listing information. In response to data received from mobile devices (e.g., mobile device 120), provider system 130 can be configured to update the listings with crowdsourced vehicle images received from the mobile devices (e.g., mobile device 120). For example, when a user is walking around a dealership lot, the camera of the user's mobile device can capture an image or a video of the vehicle within the view field of the camera.

Attributes of the vehicle in the image data may be automatically detected from which a vehicle identifier(s) (e.g. make, model, year, and/or trim) may be determined. The vehicle identifier(s) may be associated with a confidence or ranking of the likelihood that the image data depicts the output vehicle identifier(s). The determination of the vehicle identifier may be output by an image analysis model running on the mobile device or by provider system 130. A particular vehicle may then be determined based on the vehicle identifier and a lookup of particular vehicles in inventory that may be associated with the location of the mobile device when the image is captured. For example, when it is determined that a mobile device or user of the mobile device may be located at or on a particular dealership lot, the current inventory of the dealership and/or the particular dealership lot may be compared with the output vehicle identifiers to determine one or more particular vehicles in inventory that correspond with the vehicle identifiers.

In some embodiments, the image or video can be automatically transmitted to provider system 130, without operations by the user. In some embodiments, only those images or videos for which a vehicle identifier meets or exceeds a threshold confidence, ranking or score, for example, may be transmitted to provider system 130. Provider system 130 may analyze and assess the quality of the image or images frames from the video, such as the focus, contrast, brightness, blurriness, presence/degree of obstruction, etc. Based on the quality assessment, provider system 130 can use the image to update an existing listing of the particular vehicle depicted in the image. In some embodiments, provider system 130 may evaluate and select one or more images based on alternative or additional factors other than quality assessment, such as a time duration since the latest update. For example, provider system 130 may select images for updating the vehicle listing if the time duration since the latest update meets or exceeds a pre-set threshold. The evaluation and selection of images can also be based on other attributes of the existing images in the vehicle listing and the newly acquired images, such as the views of the vehicle. For example, if the listing does not include a rear view image of the vehicle, provider system 130 may select a rear view image for updating the listing, or assign a relatively higher weight to a rear view image in the selection process. Other factors or combinations of factors may also be used, which are not limited by the disclosure herein.

Provider system 130 may include one or more computing devices, such as servers, workstations, desktop computers, or special-purpose computing devices, consistent with disclosed embodiments. Provider system 130 may be standalone, or it may be part of a subsystem, which may be part of a larger system. Provider system 130 may comprise one or more applications and/or services. The one or more computing devices can be configured to execute these applications and/or services to perform the functions described herein. For example, provider system 130 can be hosted on a cloud computing platform, such as AMAZON WEB SERVICES, SOFTLAYER, and MICROSOFT CLOUD. As an additional example, provider system 130 can be hosted on a workstation to perform the functions described herein.

Provider system 130 may provide, or be associated with a system providing, a website enabling searching of vehicle listings. The vehicle listing can be associated with dealership information (e.g., the name, location, contact information or the like of the dealership where the listed vehicle is located). In response to a user query received through the website, provider system 130 can be configured to query database 150 to obtain relevant vehicle listings. The relevant vehicle listings can be displayed on the website to the user. For example, the user may perform a search on the website for a "red" "Tesla" "Model S." In response, provider system 130 can be configured to query database 150 for vehicle listings for red Tesla Model S vehicles. Provider system 130 can display the vehicle listings obtained from database 150 on the website. The vehicle listings may correspond to one or more dealerships that have red Tesla Model S vehicles in their inventories.

Listing system 140 can include one or more computing devices, such as servers, workstations, desktop computers, or special-purpose computing devices, consistent with disclosed embodiments. Listing system 140 may be standalone, or it may be part of a subsystem, which may be part of a larger system. Listing system 140 may be configured to obtain and record vehicle information, create vehicle listings with the obtained vehicle information, and present the vehicle listings on an associated website or another online platform. For example, listing system 140 can be operated by, associated with, and/or controlled by one or more auto dealerships. A dealership may have a vehicle inventory with various new or used vehicles on the lot. The dealership may operate listing system 140 to generate listings of each vehicle with the vehicle information, such as model, make, year, trim level, color, body style, engine, etc. For used vehicles, the listing may further include the mileage information, vehicle conditions, and pricing information. The vehicle information may be provided by car manufacturers or by previous owners through the trade-in process or supplied by the dealership staff. The dealership may further take images of the vehicle and add to the listing or add stock images of the same or similar vehicles to the listing.

Database 150 can include one or more physical or virtual databases coupled with provider system 130. Database 150 may include one or more computing devices configured with appropriate software to perform database operations on behalf of provider system 130 and/or listing system 140. For example, database 150 may store data associated with vehicle listings, such as vehicle images, vehicle features, and information about vehicle sales like costs or conditions. Database 150 may include relational databases (e.g., Oracle™ databases, Sybase™ databases, or the like) or non-relational databases (e.g., Hadoop™ sequence files, HBase™, Cassandra™, or the like). The particular implementation of database 150 is not intended to be limiting. In some embodiments, database 150 can be associated with provider system 130 (e.g., operated or controlled by the same entity as provider system 130). In various embodiments, database 150 can be associated with listing system 140 (e.g., database 150 can be a distributed database comprising databases associated with listing systems 140 for multiple dealerships).

Database 150 can contain vehicle listings. These vehicle listings may correspond to vehicles available at various dealerships. The vehicle listings stored in database 150 may include some or all the vehicle information included in listing system 140, such as one or more of model, make, year, trim level, color, body style, engine type, vehicle images (if any), etc. For used vehicles, the listings may further include the mileage information, vehicle condition, and pricing information. In some embodiments, the listings stored in database 150 can include additional information, compared to the vehicle information collected from listing system 140. For example, the listings stored in database 150 may further include information about listing system 140, the dealership where the vehicle is located, address and contact information of the dealership, information of similar vehicles at dealerships within the same or similar geographical area, or listings of similar vehicles stored in database 150.

Database 150 may include computing components (e.g., database management system, database server, etc.) configured to receive and process requests for data stored in database 150 and provide such stored data in response to the requests. For example, based on crowdsourced vehicle images and/or a vehicle identifier received from provider system 130, a database management system associated with database 150 may search for a corresponding listing associated with the vehicle and stored in database 150. Further, while database 150 is shown separately, in some embodiments database 150 may be included in or otherwise related to one or more of provider system 130, listing system 140, and mobile device 120.

As would be appreciated by one of ordinary skill in the art, the particular division of functions depicted in FIG. 1 is not intended to be limiting. In some embodiments, one system can be configured to perform the functions of one or more components of system 100. For example, one system can perform the functionality of one or more of listing system 140 and provider system 130. In some embodiments, multiple systems can be configured to perform the functions of a component of system 100. For example, multiple systems can perform the functions of provider system 130. In this example, a first system may receive vehicle images and vehicle identifiers from mobile device 120, a second system may process the received images and determine a quality score for the received images, and a third system may query database 150 for a listing matching the vehicle depicted in the image. Additional rearrangements and distributions of functionality would be apparent to one of skill in the art.

Figure 2:
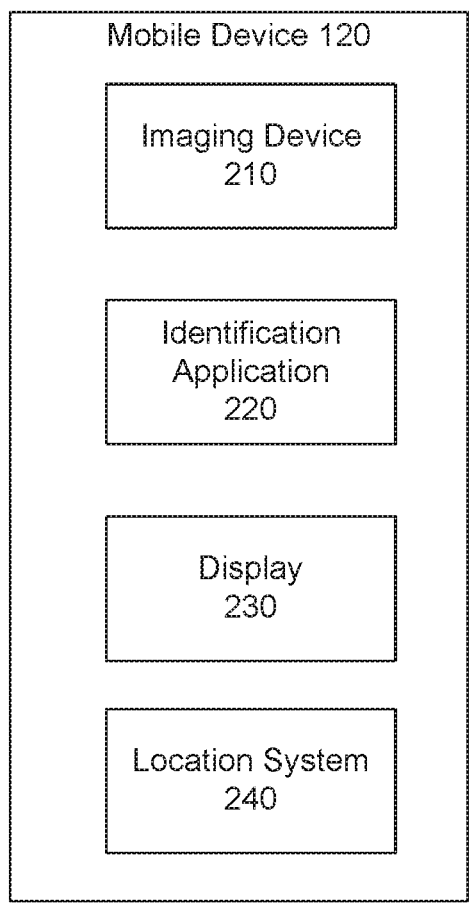
FIG. 2 depicts a block diagram of an exemplary mobile device, consistent with disclosed embodiments.

FIG. 2 depicts a block diagram of an exemplary mobile device 120, consistent with disclosed embodiments. As shown in FIG. 2, mobile device 120 may include an imaging device 210, an identification application 220, a display 230, and a location system 240. It is appreciated that mobile device 120 may include additional or fewer components than those depicted in FIG. 2, the configuration of which is not limited by the presently disclosed embodiments. Imaging device 210 can capture a vehicle image, which can be displayed on display 230 and processed by identification application 220. The image can further be transmitted by mobile device 120 to another system (such as provider system 130), along with location information determined by location system 240.

Imaging device 210 can be configurable to capture one or more images, consistent with disclosed embodiments. Imaging device can be a camera or video camera (e.g., a smartphone or laptop camera, or the like). In some embodiments, imaging device 210 can include charged coupled device (CCD) sensors, or complementary metal-oxide-semiconductor (CMOS) image sensors for their reduced power consumption attributes. Imaging device 210 can be configured to process captured images to reduce distortion or correct optical aberrations. Imaging device 210 can further be configured to convert the image into a format suitable for transmission, storage, or display. Mobile device 120 can be configured to process images captured by imaging device 210. Additionally or alternatively, mobile device 120 can be configured to provide the captured images to another system for processing (e.g., provider system 130), via network 110. Imaging acquisition parameters can be adjusted through settings of imaging device 210. For example, exposure and focus can be adjusted; and different modes such as HDR (high dynamic range), Burst Mode, or flash mode can be applied based on the actual setting.

Identification application 220 can be an application program installed on mobile device 120, which can be used to identify attributes of a vehicle based on an image or a video feed. Non-limiting examples of suitable identification applications are described in U.S. Pat. No. 10,319,007, and incorporated herein by reference. In some embodiments, identification application 220 can use trained machine learning models, such as convolutional neural networks, to identify attributes of the vehicle, such as one or more of make, model, model year, trim level, color, and body style. The machine learning models can be trained using training data including a variety of vehicle and non-vehicle images captured under a variety of conditions and from a variety of angles. Based on the trained models, identification application 220 can identify attributes of the vehicle based on the image captured by imaging device 210. For example, identification application 220 can use a pre-trained model to identify model and make of the vehicle depicted in the image. Other attributes can also similarly be identified, such as year, color, trim, etc.

Identification application 220 can be configured to determine one more quality parameters of captured images, consistent with disclosed embodiments. High-quality images may be those suitable for use in identifying a vehicle, while low quality images may be unsuitable for use in identifying a vehicle. Examples of low-quality images include images that do not capture the entirety of the vehicle, images that are too dark or out of focus, and images in which the vehicle is obstructed. In response to determining that a captured image is low-quality, identification application 220 may prompt the user to retake the image. Identification application 220 can further provide the user instructions based on the quality of the captured image. For example, if the captured image lacks sufficient brightness, identification application 220 may provide a prompt message on display 230, "please increase brightness." As another example, if the contrast of the image is not sufficient, identification application 220 may provide a prompt message on display 230, "please adjust contrast." These examples are not intended to be limiting: other prompts can be provided to address other quality issues in the captured images. In some embodiments, the prompt can be presented via a visual alert (e.g., an augmented reality image displayed on display 230, such as a text message or reticle), audio alert, a haptic alert (e.g., a vibration), or any combination of the foregoing. Once the image acquisition setting is adjusted and an image suitable for the identification is obtained, identification application 220 can identify attributes of the vehicle depicted in the image. In some embodiments, imaging device 210 can capture multiple images (e.g., a sequence of images or a video feed that include multiple frames). Identification application 220 can perform the identification process based on some or all of the captured multiple images.

Identification application 220 can be configured to select some of the captured multiple images for sending to provider system 130, consistent with disclosed embodiments. For example, when the multiple images comprise a video feed, the selected images can be frames taken out of the video feed. For example, identification application 220 can be configured to determine a quality score for the images based one or more image quality parameters. The image quality parameters can include, for example, focus, contrast, obstructions, brightness, blurriness, distortions, color accuracy, etc. Identification application 220 can determine the quality score based on criteria corresponding to each quality parameter. For example, a contribution of a quality parameter to the score can depend on whether a value of the quality parameter exceeds a threshold (e.g., an image satisfies a brightness threshold, a degree of focus threshold, an obstruction detection threshold, etc.). In some embodiments, the thresholds may be preset and each threshold may correspond to each quality parameter. For example, a score can be determined for each quality parameter based on a corresponding preset threshold. A total score can be determined as an overall quality score. Images with higher scores can be selected for providing to provider system 130. For example, images with a quality score higher than a preset threshold can be selected, or a predetermined number of images with higher quality can be selected.

In some embodiments, identification application 220 can be configured to assess image quality based on a subset of the quality parameters described herein. For example, identification application 220 can be configured to determine whether there is an obstruction and/or whether the image is in focus. For example, identification application 220 can determine whether an obstruction in the vehicle image blocks the vehicle by more than a set threshold (such as a set percentage). Identification application 220 may not provide such an obstructed image to provider system 130. In some embodiments, identification application 220 may not provide images including any obstructions, regardless of the degree of obstruction. In some instances, identification application 220 may not recognize obstructed or out-of-focus images as vehicles, and therefore may not provide such images to provider system 130. In this manner, the quality assessment performed at mobile device 120 can be limited, thus improving efficiency and reducing the resources consumed.

Identification application 220 can be configured to use various image processing techniques in assessing image quality. For example, identification application 220 can use an object detection model to detect the presence of obstructions. Suitable object detection models can include those based on neural network architectures, such as You Only Look Once (YOLO) or Single Shot Detector (SSD). YOLO can apply a single neural network to the full image. The network divides the image into a plurality of regions and predicts bounding boxes and probabilities for each region. The bounding boxes can be weighted by the predicted probabilities. To detect obstructions, labeled data can be used which include bounding boxes drawn of "vehicles" and "obstructions." The bounding boxes can be focused around the unobstructed part of an object or the obstructed part. The detection result can be based on overlaps between the detected obstructions and the vehicle in the photo. Alternatively, presence of obstructions can be determined if the box for an obstruction has a side that is touching or very close to the side of the box found for the vehicle. SSD can apply the input image to a convolutional network and calculate a feature map, which can be used to predict bounding boxes and corresponding probabilities. As an additional example, identification application 220 can use an image segmentation model, such as a U-Net or DeepLab model, to detect the presence of obstructions. Instead of using bounding boxes, such image segmentation models categorize each pixel of an image and determine whether it represents a given object, a vehicle in this instance. For example, to detect obstructions, rules can be set regarding an expected shape and/or proportion of a segmented vehicle to determine whether the vehicle is obstructed. With respect to focus detection, edge detection techniques can be used to measure a degree of focus. Weaker edges can indicate that the image is out of focus. Alternatively, the degree of focus can be determined based on the difference between the brightest and the darkest pixel in the image. Other image quality assessment techniques can be applied, which are not limited by the examples provided herein.

Identification application 220 can be configured to generate a display including the attributes information. In some embodiments, this display can superimpose the attributes information on the vehicle image. As a non-limiting example, identification application 220 may identify the attributes "red," "Tesla," and "Model S" as corresponding to one or more captured vehicle images. These attributes can be displayed to the user superimposed on an image of the vehicle (e.g., one of the captured images used to identify the attributes or simply the present image captured by imaging device 210). In some embodiments, based on the identified attributes, mobile device 120 may further search and provide for display other vehicle related information, such as contact and address information of the nearest dealership, and pricing information of the same or similar vehicles. Similar to the display of vehicle attributes, augmented reality techniques can be used for the display of vehicle-related information in some embodiments. For example, the techniques disclosed in U.S. Pat. No. 10,140,553 can be utilized to implement displaying vehicle-related information superimposed on the vehicle image.

Display 230 can be configured to present various information to the user on a screen. Display 230 can take the form of, for example, a liquid crystal display (LCD) display, an organic light-emitting diode (OLED) display, and a touch screen. Display 230 can further serve as an input device by interacting with a user and responding to the user's touch or contact. In some embodiments, when imaging device 210 captures an image or a video of a vehicle, the image or video can simultaneously be presented on display 230. The user can view the image or video on the display and can further adjust the image acquisition parameters accordingly.

Location system 240 can be configured to determine a real-time geographic location of mobile device 120. Location system 240 can comprise software, hardware, or a combination of software and hardware. In some embodiments, mobile device 120 can be configured to transmit the determined location data to provider system 130. For example, identification application 220 can be configured to transmit the determined location to provider system 130 (e.g., together with images of a vehicle). In some embodiments, location system 240 can comprise a GPS receiver integrated into, or communicatively connected to, mobile device 120. For example, when mobile device 120 is a smartphone, location system 240 can comprise a GPS receiver built into the smartphone. As a further example, GPS software installed on mobile device 120 can allow mobile telephones to use an internal or external GPS receiver (e.g., connecting via a serial port or Bluetooth) for location determination. Alternatively, location system 240 can be hardware and/or software enabling the mobile device to determine its location using cell tower triangulation, beacon-based technology, or a similar method. For example, some mobile devices or apps use low energy bluetooth technology (beacon-based) for location determination, which provides high accuracy but requires low power usage. The particular method of location determination is not intended to be limiting.

It is appreciated that the structure and components of mobile device 120 depicted in FIG. 2 is only exemplary. Mobile device 120 may include fewer components or additional components. The described functions of mobile device 120 can be allocated among the components of mobile device 120 as described, or differently. For example, mobile device 120 may include a communication component which can receive and transmit information and facilitate information exchange between mobile device 120 and other devices or systems, such as provider system 130. As an additional example, the communication component can be configured to send the vehicle image captured by imaging device 210 and the vehicle identifier determined by identification application 220 to provider system 130 for further processing.

Figure 3:
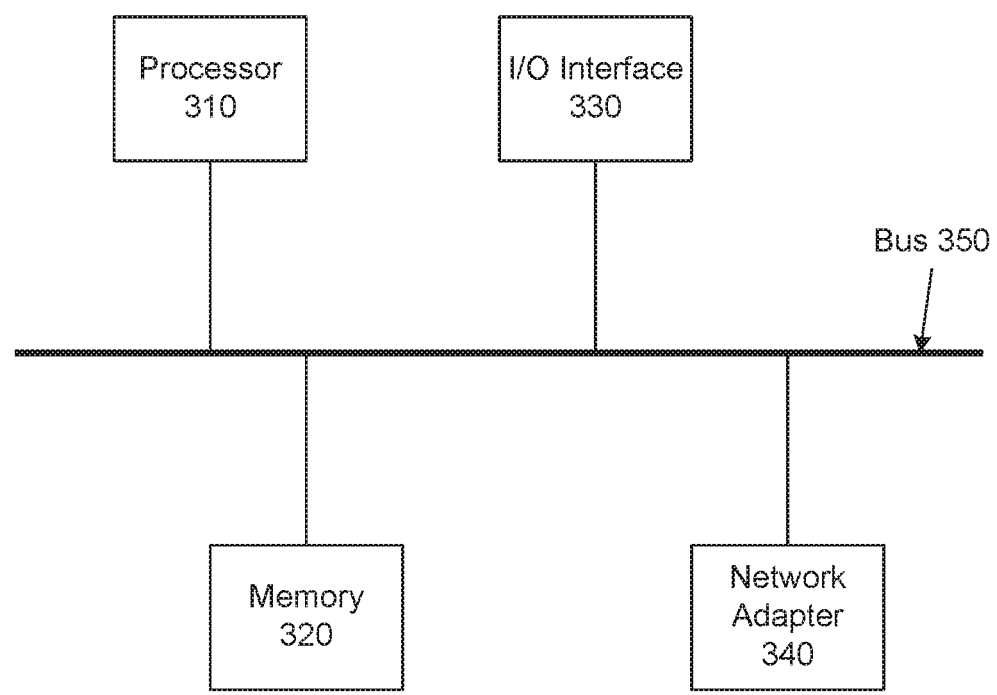
FIG. 3 depicts a block diagram of an exemplary computing device, consistent with disclosed embodiments.

FIG. 3 depicts a block diagram of an exemplary computing device 300 suitable for use with the disclosed embodiments. According to some embodiments, computing device 300 includes a processor 310, memory 320, I/O interface(s) 330, and network adapter 340. These units may communicate with each other via bus 350, or wirelessly. The components shown in FIG. 2 may reside in a single device or multiple devices. Mobile device 120, provider system 130 and/or listing system 140 can comprise computing devices similar to computing device 300.

In various embodiments, processor 310 may be one or more microprocessors or central processor units performing various methods in accordance to the embodiment. Memory 320 may include one or more computer hard disks, random access memory, removable storage, or remote computer storage. In various embodiments, memory 320 stores various software programs executed by processor 310. I/O interfaces 330 may include a keyboard, a mouse, an audio input device, a touch screen, or an infrared input interface. Network adapter 340 enables computing device 300 to exchange information with external networks, such as network 110 as depicted in FIG. 1. In various embodiments, network adapter 340 may include a wireless wide area network adapter, or a local area network adapter.

Figure 4:
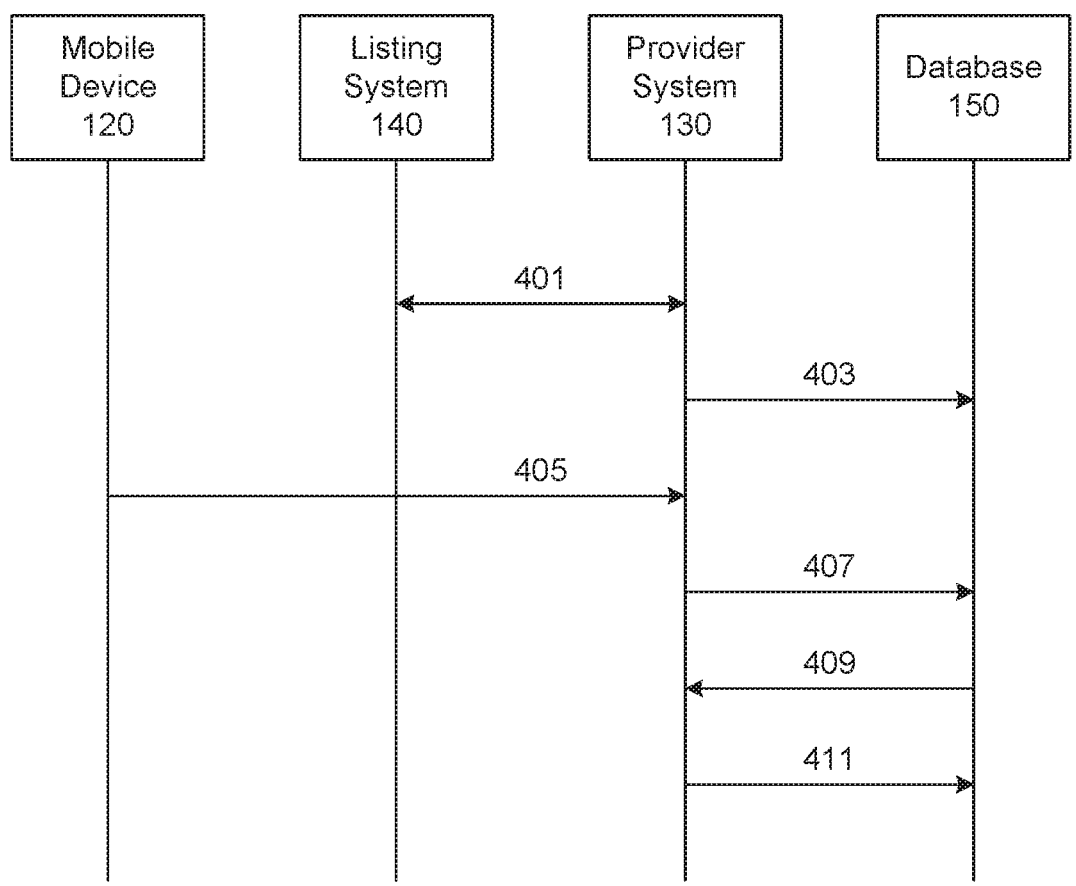
FIG. 4 depicts an exemplary interaction diagram for a method of creating and updating vehicle listings, consistent with disclosed embodiments.

FIG. 4 depicts an exemplary interaction diagram of a method 400 of creating and updating vehicle listings, consistent with disclosed embodiments. As shown in FIG. 4, the process may involve interaction steps 401-411 between various components of system 100. These interactions may enable provider system 130 to collect images of a vehicle from mobile device 120 as a user interacts with mobile device 120 to obtain information about the vehicle. In this manner, method 400 enables provider system 130 to update vehicle listings using crowdsourced images incidentally collected by users as those users obtain information about vehicles.

In step 401, provider system 130 can communicate with listing system 140 to create a vehicle listing. Listing system 140 can be associated with, operated by, or controlled by a dealership. Listing system 140 can automatically, or in response to user instructions, interact with provider system 130 to generate listings. In some embodiments, these listing can correspond to vehicles in the inventory of the dealership. In various embodiments, the listings may be created in listing system 140 and provided to provider system 130. For example, listing system 140 can include a plurality of vehicle listings corresponding to the dealership's vehicle inventory. Provider system 130 may obtain the existing information included in the dealership listings. In this example, one or more dealerships may grant provider system 130 access to their internal listing systems, so that the listing information can be pulled by provider system 130. Alternatively or additionally, the dealerships may periodically forward or send their listing information to provider system 130 via network 110.

In step 403, provider system 130 can create a listing and store the created listing in database 150. In some embodiments, provider system 130 may utilize the information collected from listing system 140 and create a pool of vehicle listings corresponding to the inventories of one or more dealerships.

In step 405, provider system 130 can receive one or more vehicle images and an identifier for the vehicle depicted in the image from a user device, such as mobile device 120 depicted in FIG. 1. The identifier may have been determined by an identification application running on mobile device 120 (e.g., identification application 220). The identifier can include one or more attributes of the vehicle, such as one or more of vehicle model, make, year, body style, color, trim level, etc. The identifier can further indicate the view of the vehicle in the image, such as rear view, left side view, right side view, or front view. For example, the identifier can include the attributes "Honda," "Accord," "White," "Sedan." The set of identified attributes may vary, depending on the quality of the vehicle images or the accuracy of the identification application running on mobile device 120. For example, when the one or more images were taken from a skewed angel, from a far distance, or under insufficient lighting, fewer identified attributes may be received than when the one or more images were taken under adequate lighting, at close range, with a proper camera position. To continue this example, when the one or more images were taken under insufficient lighting, the identification application running on the mobile device may identify the vehicle as a "Honda Accord Sedan LX," but may not identify whether the vehicle is dark gray, dark blue, or medium black.

It is appreciated that provider system 130 may receive a plurality of vehicle images. The images can be selected frames from a video feed captured by mobile device 120. In some embodiments, the image or frame selection process can be automatic (e.g., without user interaction or even awareness). In some embodiments, provider system 130 may further receive location information from mobile device 120. The location information may indicate a real-time location determined by a location service module of mobile device 120. For example, the location information may indicate where mobile device 120 is located while capturing the vehicle image or transmitting the image to provider system 130. In some embodiments, the location information can be determined based on the user checking in at an associated dealership. For example, provider system 130 may be associated with the dealership's check-in system, or the user may check in online at the dealership through a mobile app associated with provider system 130. Provider system 130 can use the location information to pinpoint the lot or the dealership where the user is currently visiting, or identity a group of listings corresponding to the location data. Different dealerships may have the same or similar vehicles in their inventories, with the location data provided by mobile device 120, provider system 130 can narrow the search when querying database 150 for a corresponding vehicle listing.

In step 407, provider system 130 can query database 150 (through, for example, a database management system associated with database 150) for vehicle listings using the received vehicle identifier. For example, provider system 130 may provide instructions to database 150 to retrieve stored vehicle listings that correspond to the received vehicle identifier. For example, when the vehicle identifier comprises "Tesla Model S Red 2018," database 150 can query listings stored in database 150 and search for listings matching "Tesla Model S Red 2018."

In cases where the location information is received from mobile device 120, database 150 can further conduct the search based on the location information. For example, there may be a plurality of listings of "Tesla Model S Red 2018" stored database 150, respectively corresponding to vehicles stocked at various dealerships. Database 150 can narrow the search based on the location information and search for a listing corresponding to a dealership in the vicinity of the location indicated by the location information. Accordingly, the exact listing corresponding to the vehicle depicted in the image may be identified.

In step 409, database 150 can identify one or more vehicle listings corresponding to the vehicle depicted in the image and returns the one or more vehicle listings to provider system 130. Consistent with disclosed embodiments, database 150 (through, for example, an associated database management system) can retrieve vehicle listings based on the vehicle identifier. For example, the vehicle listings can indicate various attributes or features of the corresponding vehicles. Database 150 can compare the received identifier to the attributes included in the obtained listings and identify one or more listings matching the received identifier. In some embodiments, such matching may require the received identifier equal the corresponding attributes of a vehicle listing. In various embodiments, such matching may include soft matching, wherein the received identifier and the corresponding attributes of a vehicle listing satisfy some matching criterion (e.g., a distance-based criterion that transforms differences between the received identifier and the corresponding attributes into a distance and identifies a soft match when the distance is less than a threshold). The disclosed embodiments are not intended to be limited to a particular type of matching. In some embodiments, database 150 can retrieve vehicle listings based on the location information and the vehicle identifier. For example, the location received from mobile device 120 can be matched to a dealership (e.g., by provider system 130, database 150, or another component of system 100) and database 150 can correspondingly obtain listings associated with that dealership. As an additional example, the vehicle listing can include location information and database 150 can be queried for vehicle listings having locations within a certain distance of the indicated location.

As an example of identifying and returning one or more vehicle listings using location information and vehicle attributes, provider system 150 may provide an identifier "Tesla Model S Red 2018" and location information to database 150. The location can be in the form of geographical coordinates or any other form that indicate a geographical location. Based on the received location information, database 150 may identify a location of "123, X Street, NW, Washington D.C." Database 150 may then obtain a plurality of vehicle listings corresponding to "123, X Street, NW, Washington D.C." Alternatively, database 150 can identify a dealership ABC located at or in the vicinity of "123, X Street, NW, Washington D.C.," and obtain a plurality of vehicle listings of dealership ABC. Based on the obtained plurality of vehicle listings, database 150 may search for a listing that matches the identifier "Tesla Model S Red 2018." Accordingly, the listing corresponding to the received vehicle image from mobile device 120 can be identified and provided to provider system 130.

In some instances, database 150 may identify multiple listings based on the received identifier and location information. This can occur, for example, when the dealership corresponding to the location information has multiple listings corresponding to the same vehicle or similar vehicles. To continue the prior example, the dealership matching the location information may have multiple vehicle listings that match "Red Tesla Model S 2018." These vehicle listings may correspond to different vehicles with differing interiors, trim levels, or vehicle conditions. As explained above with reference to FIG. 2, the details and number of attributes indicated in the identifier may vary depending on quality of captured vehicle images or the machine learning models used in the identification process. In cases where the identifier includes a limited number of vehicle attributes, database 150 may not identify the particular vehicle listing corresponding to the vehicle depicted in the received image. Even when the identification application can identify a full set of attributes, multiple vehicle listings may share these attributes (e.g., the dealership may include multiple red Tesla Model S vehicles having the same trim and interior).

In some embodiments, provider system 130 may request further input from mobile device 120 to assist in identifying the particular vehicle listing. For example, in cases where multiple vehicle listings are identified by database 150, provider system 130 may send a prompt to mobile device 120, requesting further vehicle information. The prompt may request one or more additional vehicle images, vehicle images of a specified view, VIN, or an image of the VIN. Based on the prompt, the user can provide additional images or input the information requested. Such additional information can be used to identify more attributes of the vehicle to update/supplement the vehicle identifier, and to narrow the search for the corresponding vehicle listing(s). Alternatively, provider system 130 may push the identified listings to mobile device 120, requesting user input selecting the particular vehicle listing that corresponds to the vehicle images. The user can select the particular vehicle listing based on other vehicle attributes, such as pricing information, mileage, or VIN. Because the user is likely still on the lot where she/he took the images, the user can easily provide the requested information or selection to provider system 130. That way, provider system 130 can identify the particular listing corresponding to vehicle depicted in the received images to ensure subsequent updating is properly performed for the right vehicle.

In step 411, provider system 130 can update the one or more vehicle listings retrieved from database 150. In some embodiments, provider system 130 can be configured to compare the quality of existing image(s) associated with each of the one or more vehicle listings to the quality of the one or more images received from mobile device 120. In some instances, the existing image(s) may have been collected from listing system 140 when the vehicle listing was created. In various instances, the existing image(s) may have been received previously from the mobile device of another user. In some embodiments, provider system 130 may evaluate the existing image(s) and the received images from mobile device 120, to select one or more of the received images for updating the vehicle listing(s).

In some instances, provider system 130 can be configured to determine a quality score based on one or more image quality parameters for the existing image(s) associated with each of the one or more vehicle listings. As described above, the quality score can be determined based on various quality parameters, such as focus, contrast, blurriness, obstructions, brightness, distortions, color accuracy, etc. Provider system 130 can compare this determined quality score to the quality score for the one or more images received from mobile device 120. In some embodiments, received vehicle images with quality scores exceeding the quality scores of the images associated with a vehicle listing can be associated with the vehicle listing (e.g., added to the vehicle listing). For example, when the vehicle listing includes an image having a score B and two images were received from the mobile device (e.g., two frames of a video stream), the first having a score C less than score B and the second having a score A greater than score B, provider system 130 can add the second image to the vehicle listing but not the first image. In some embodiments, provider system 130 can replace lower scoring images with higher scoring images. When a listing does not include an image, provider system 130 can add the received images to the vehicle listing. When multiple images are received and/or a listing is associated with multiple images, provider system 130 can determine a quality score of each of these images and select a preset number of images to be included in the updated listing based on the quality scores. In some embodiments, quality scores may be stored with images, so that provider system 130 need not re-derive them every time a vehicle listing is considered for updating.

In some embodiments, selection of the received images may be based on alternative/additional factors. For example, provider system 130 may select one or more received images based on different views of the vehicle. If the existing images do not include any left side view of the vehicle, provider system 130 may select a left side view image from the received images or assign a higher priority/weight to left side view images in the selection process. That way, images of different views of the vehicle can be added to the vehicle listing and the user can benefit from the various views when researching vehicles online. In some embodiments, provider system 130 may compare the time(s) associate with existing images, and update the listing by replacing older images with the newly received images from mobile device 120. Further, in some embodiments, provider system 130 may determine a time duration since the last update (for example, based on the time stamp of the most-recently added vehicle image). Provider system 130 may update the vehicle listing if the time duration meets or exceeds a pre-set threshold.

In some embodiments, when provider system 130 retrieves multiple vehicle listings matching the received identifier, provider system 130 may not update any of the listings. In this manner, provider system 130 may avoid updating listings with an image of a different vehicle. Alternatively, provider system 130 may add the received one or more images to listings that do not include any vehicle image. That way, the listings can be updated to include at least images of similar vehicles (if not the same) from the same dealership. For example, for the identifier "Red Tesla Model S 2018," if the same dealership has multiple vehicles matching "Red Tesla Model S 2018" and some of the listings of these vehicles do not include any images, provider system 130 can add the received image to those listings. Subsequently, when a user views the updated listings, the user can view images of an actual "Red Tesla Model S 2018" vehicle available at the same dealership. For listings matching "Red Tesla Model S 2018" that include existing listing images, provider system 130 may add the received image alongside the existing listing images. Alternatively, provider system 130 may further compare the quality of the existing images and the received image and update the listing by performing similar procedures based on the quality scores as described above.

With the technical solutions described above with reference to FIG. 4, when a user is present on the lot of a dealership, an imaging device on the user's mobile device can capture an image (or a video feed) of a vehicle on the lot. An identification application on the mobile device can determine an identifier of the vehicle, and automatically send the captured image and the determined identifier to a provider system. The provider system can use the captured image to update an existing listing of the vehicle. Accordingly, when another user is viewing the updated vehicle listing, e.g., remotely on a website, the user can benefit from the inclusion of the recently-captured image. Further, the technical solutions can reduce the resources devoted by dealerships for capturing and processing images of vehicles in the inventory.

As would be appreciated by one of skill in the art, the particular order and arrangement of steps disclosed in FIG. 4 is not intended to be limiting. For example, steps can be re-arranged or combined without departing from the envisioned embodiments. Steps can be divided into sub-steps that can be performed in a different order, or by other components of system 100. Furthermore, additional steps may be added or steps may be removed without departing from the envisioned embodiments. For example, in some embodiments, after a vehicle listing is updated, provider system 130 can generate a timestamp and associate the timestamp with the updated listing. The timestamp can indicate a time when the additional image(s) were taken or added to the listing, or when the updated listing is published.

Figure 5:
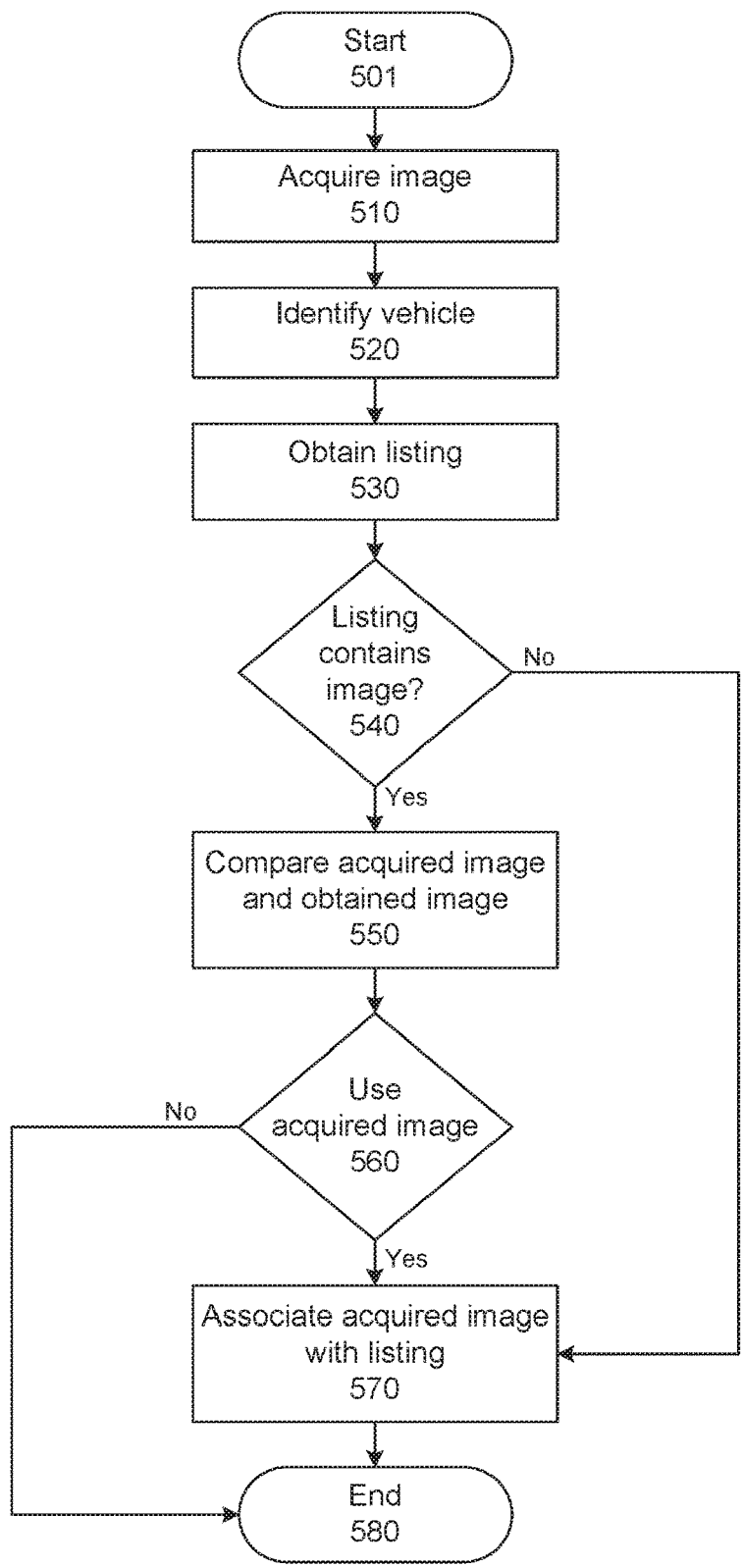
FIG. 5 depicts a flowchart of an exemplary process for automatically collecting and processing crowdsourced images to update vehicle listings, consistent with disclosed embodiments.

FIG. 5 depicts a flowchart of an exemplary process 500 for automatically collecting and processing crowdsourced images to update vehicle listings, consistent with disclosed embodiments. As shown in FIG. 5, process 500 includes steps 501-580. Process 500 can be implemented by, for example, a mobile device (such as mobile device 120) and a vehicle listing provider system (such as provider system 130), to utilize crowdsourced vehicle images to update vehicle listings.

After starting in step 501, mobile device 120 can acquire one or more images of a vehicle in step 510. For example, a user in a dealership may use identification application 220 running on mobile device 120 to obtain information about a vehicle. The user may image the vehicle using imaging device 210 of mobile device 120, so that identification application 220 can identify features of the vehicle. In some instances, the user may position the camera in response to instructions provided by identification application 220. In some embodiments, identification application 220 can display identified features and other vehicle related information on top of the vehicle image. In some embodiments, the image can include a frame of a video feed captured by imaging device 210.

In some embodiments, the image can be captured automatically without user operations, when mobile device 120 is on the lot with vehicles in the vicinity. For example, mobile device 120 can include a location service module which can position mobile device 120. If it is detected that mobile device 120 is located on a lot of a dealership, imaging device 210 of the mobile device 120 can be activated to capture images or videos of the vehicles within the field of view.

In step 520, mobile device 120 can determine an identifier of the vehicle in the image using identification application 220. The identifier may indicate one or more vehicle attributes. For example, the determined identifier can be "Red Tesla Model S 2018." Mobile device 120 can send the image and the determined identifier to provider system 130.

In some embodiments, multiple images may be captured by imaging device 210. Identification application 220 may perform vehicle identification based on the multiple captured images. Further, identification application 220 may perform a quality assessment on the captured images by, for example, determining quality scores for the captured images. The quality assessment can be based on one or more quality parameters, such as focus, contrast, brightness, blurriness, presence of obstructions, etc. For example, the quality scores can be determined based a degree of focus of the image, a degree of brightness of the image, and a degree of contrast of the image. Further, each quality parameter (in this example, obstruction, brightness, and contrast) can be assigned a respective weight, and the quality score can be determined on the determined degrees of focus, brightness, and contrast and the respective weights. Further, the quality assessment process can include detecting whether the vehicle is obstructed or blocked in the image.

In some embodiments, based on the determined quality scores of the images, a preset number of images with higher quality scores, or images with quality scores higher than a preset threshold can be provided to identification application 220 for determining a vehicle identifier. That way, efficiency and accuracy of the identification process can be improved. Alternatively, in some embodiments, the quality assessment process can also be performed after identification application 220 performs vehicle identification based on the captured images. Through the quality assessment process, one or more captured images can be selected for sending to provider system 130 along with the determined identifier via network 110. Accordingly, the quality assessment and the selection process can help ensure only high-quality images are provided to provider system 130, thereby reducing the amount of data transmitted to provider system 130.

In some embodiments, the quality assessment and the image selection process can be performed automatically and without user operations. For example, when the user is visiting a dealership lot and uses identification application to identify a vehicle, imaging device 210 of mobile device 120 may capture a video feed of the vehicle. Based on the video feed, mobile device 120 (through identification application 220 or other components) can automatically perform quality assessment on the frames of the video feed and select one or more frames for sending to provider system 130. In this manner, user experience is not affected.

In some embodiments, mobile device 120 can further send location information and/or time information associated with the captured image to provider system 130. The location information can indicate a location of mobile device 120 when capturing the image, which corresponds to a location of the vehicle depicted in the image and can be used to identify the dealership that has the vehicle in inventory.

The time information can indicate a time when the image is captured by mobile device 120, or a time when the image is sent to provider system 130. In some embodiments, a location and/or a time stamp can be added to and displayed on the image. The location stamp and the time stamp can take various formats, such as adding the following information to the image, "123, X Street, NW, Washington D.C." and "12:30 PM, Jul. 7, 2019." Alternatively, the location information and the time information can be indicated in the metadata associated with the image.

In step 530, based on the received vehicle identifier and location information, provider system 130 can obtain an existing vehicle listing. The vehicle listing can correspond to the vehicle depicted in the received image. Provider system 130 can retrieve the vehicle listing from a database storing existing vehicle listings (such as database 150 depicted in FIG. 1). As described herein, this database may include listings corresponding to inventory vehicles of various dealerships.

In some embodiments, provider system 130 can validate the received vehicle identifier. For example, provider system 130 can be configured to apply the received image to a machine learning model trained to identify vehicle attributes based on a vehicle image. In some embodiments, this machine learning model may be the same as the machine learning model used by identification application 220. In some embodiments, this machine learning model may be a newer version of the machine learning model used by identification application 220. Alternatively or additionally, the machine learning model can be a more sophisticated and/or computationally intensive machine learning model than the machine learning model used by identification application 220. For example, a machine learning model implemented in provider system 130 can use different machine learning algorithms than those used in identification application 220. As an additional example, this machine learning model can be trained with a different or larger set of training data to obtain more accurate identification results. In some embodiments, for example, the machine learning models implemented in provider system 130 can utilize the aggregated pool of listings stored in database 150 as training data to improve the performance of the machine learning models. As the listings stored in database 150 are updated/supplemented based on new vehicle information collected from various dealerships, the listings can be fed to the machine learning models in provider system 130 for model training purposes. On the other hand, identification application 220 can be a plug-in module executing identification functionalities using limited resources available on mobile device 120. The functionalities, identification accuracy, and computational capability of the machine learning models utilized by identification process 220 can be different from, or relatively limited compared to those implemented in provider system 130.

Provider system 130 may perform vehicle identification based on the received image using the machine learning models. The determined vehicle identifier may be different from the received identifier. For example, the vehicle identifier determined by provider system 130 can include more attributes than those included in the received identifier. Provider system 130 can further use the newly determined identifier to validate the received identifier, by correcting, supplementing, or replacing attributes indicated in the received identifier. For example, provider system 130 may determine the depicted vehicle to be "Red Tesla Model 3 2018," instead of the "Red Tesla Model S 2018" identifier received from mobile device 120. Provider system 130 may revise the received identifier to reflect "Red Tesla Model 3 2018" for subsequent processing.

Based on the received vehicle identifier (or the validated identifier as described above), provider system 130 can request database 150 (or a database management system associated with database 150) to identify a listing corresponding to the vehicle identifier. For example, database 150 may conduct a search based on the vehicle identifier, such as "Red Tesla Model S 2018," to obtain an existing listing matching the identifier. In some embodiments, the search can further be based on the location information received from mobile device 120.

For example, database 150 may first obtain a plurality of listings corresponding to the received location information, and then filter the listings based on the received identifier to identify the listing corresponding to the vehicle depicted in the received image. Alternatively, database 150 may first obtain a plurality of listings matching the vehicle identifier, and then filter the plurality of listings based on the received location information to identify the listing corresponding to the vehicle depicted in the received image. In some embodiments, the location information and the vehicle identifier can be used as search filters simultaneously to identify the listing corresponding to the vehicle depicted in the received image. Database 150 can send the identified listing to provider system 130. As described above in connection with FIG. 4, after receiving the plurality of listings from database 150, provider system 130 may request additional vehicle information from mobile device 120 to assist in identifying the particular vehicle listing corresponding to the vehicle depicted in the received image.

In step 540, provider system 130 can analyze the obtained listing from database 150 and determine whether the listing contains a vehicle listing image. If it is determined that the listing contains an existing listing image, process 500 can proceed to step 550. If it is determined that the listing obtained from database 150 does not include an existing listing image, process 500 can proceed to step 570.

In step 550, provider system 130 can compare the one or more received image(s) with the one or more existing images of the vehicle listing(s) obtained from database 150. For example, provider system 130 may perform a quality assessment and compare the qualities of the received image (s) and the existing image(s). Provider system 130 may determine a quality score respectively for the received image(s) and the existing listing image(s) based on various quality parameters, such as focus, contrast, obstructions, brightness, blurriness distortions, color accuracy, etc. As an example, provider system 130 can measure a degree of focus, a degree of brightness, a degree of contrast, and a degree of obstruction respectively for the received image and the existing listing image, to determine a quality score of each image. Provider system 130 can further assign a weight to each of the measured parameters, and determine an overall quality score based on the assigned weights and the determined degrees.

The quality assessment process performed in step 550 can involve procedures similar to those described above with reference to step 520 and those described above with reference to FIG. 2, and can also include additional procedures or measure additional quality parameters. For example, in addition to measuring a degree of focus and detecting obstructions in the image, provider system 130 can further measure a degree of brightness and/or a degree of blurriness of the image. In some embodiments, Laplacian methods can be used to detect a degree of blurriness of the image. A blurriness metric can involve processing the images by converting to greyscale from RGB channels and aggregating the result to obtain a representative value indicating the degree of blurriness of the image. The obtained value can further be compared with a preset threshold. For example, the image can be discarded if the degree of blurriness exceeds the threshold.

In some embodiments, a Fourier Transform can be used to compute the image and to analyze the spread of frequencies. The amount of high frequencies can indicate the degree of blurriness. The lower amount of high frequencies, the blurrier the image. Various other metrics can be used, such as edge detection techniques (for example, Sobel or Scharr filter, Canny edge detection), the variance or maximum of the Laplacian, or a measure of contrast or intensity variance. A degree of brightness can also be captured with a measure of contrast or intensity. For example, the mean or RMS (root mean square) of the grey-scaled image can be determined, to indicate the degree of brightness. Alternatively, the image can be converted to HSV (hue, saturation, value) or HSL (hue, saturation, lightness) color model, which can separate the brightness of each pixel into its own channel. In some embodiments, a binary determination can be made to categorize whether an image as either blurry or non-blurry, and bright or dark, based on a predetermined threshold. Further, machine learning models can be trained and used to classify the received image, or determine a degree of brightness and/or a degree of blurriness of the image.

In step 560, based on the quality scores of the received image and the existing listing image, provider system 130 can determine whether to use the received image to update the existing listing. For example, if the quality score of the received image is the same or higher than that of the existing listing image, provider system 130 can replace the existing listing image with the received image, or add the received image to the listing (e.g., step 560—"yes" branch). If the quality score of the received image is lower than that of the existing listing image, provider system 130 can either add the received image to the listing or discard the received image and end process 500 at step 580 (e.g., step 560—"no" branch).

In some embodiments, the listing obtained from database 150 may include a plurality of existing listing images. Provider system 130 can remove one or more of the existing listing images if the quality scores of the existing images are lower than a preset threshold, or if the degree of obstruction of the images exceed a preset threshold. Provider system 130 can further compile a list of the received image(s) and the existing listing image(s) based on their quality scores (from high to low or from low to high) and select a predetermined number of images to be included in the updated listing. Alternatively, provider system 130 can select images with a quality score higher than a preset threshold to be included in the updated listing. As described in above in connection with FIG. 4, selection of images can be based on alternative or additional factors, details of which are not repeated herein.

In step 570, provider system 130 can associate the received image with the obtained listing. For example, provider system 130 may update the obtained listing by adding the received image to the listing and storing the updated listing in database 150. That way, when a user navigates a web platform associated with provider system 130, the user can view the updated vehicle listing with a recently captured image of the actual vehicle. In some embodiments, the received image may include a location and/or time stamp indicating a time when the image was captured and a corresponding location. The location and/or time stamp can alternatively be added or edited by provider system 130 based on the information received from mobile device 120.

In some embodiments, provider system 130 can include or be associated with a web platform for researching vehicles. The web platform and provider system 130 can be controlled or operated by the same entity, such as a vehicle listing service provider. The web platform can be used to display vehicle listings created by provider system 130 and/or stored in database 150, and any updates thereof. In the forgoing example, once the vehicle listing is updated with the received image from mobile device 120, the update listing can be reflected on the web platform, replacing the previous version.

Further, provider system 130 can be connected to the listing systems of various dealerships. As disclosed herein, provider system 130 can receive listings, or the information necessary to create listings, from the listing systems of the various dealerships (e.g., listing system 140). Provider system 130 can display these listing on a website associated with provider system 130 or make them available for display through a downloadable application running on a computing device of a user. In some embodiments, provider system 130 can share listings with the associated listing systems. For example, provider system 130 can share a listing for a vehicle located at a dealership with a listing system for the dealership. A web page associated with the dealership can then display the listing. When provider system 130 updates a vehicle listing, provider system 130 can share the updated vehicle listing with the corresponding dealership that has the listed vehicle in inventory. For example, provider system 130 can notify the corresponding dealership that an updated listing is available. Alternatively, provider system 130 can automatically push the updated listing to a listing system (such as listing system 140 depicted in FIG. 1) associated with the corresponding dealership, so that the updated listing can be reflected on the dealership's listing system. For example, when a user clicks on the listing on the dealer's listing system such as the dealer's website, the listing system can automatically access database 150 to pull the updated listing for display. In some embodiments, the dealership can have access to database 150, so that the updated listing can be accessed or obtained. Accordingly, with the above described solutions, the dealership can efficiently update their vehicle listings with crowdsourced vehicle images.

To further illustrate the application and benefits of the technical solutions described above, an exemplary application scenario is provided next. A dealership may take in a trade-in vehicle "Red Tesla Model S 2018," which is available in the dealership's inventory and customer-ready on the lot. The dealership can create a listing in their listing system for the vehicle. The listing may indicate the vehicle as a Red Tesla Model S 2018 but may not include any actual images of that vehicle. The dealership may post the listing on their listing system (such as dealership system 140 depicted in FIG. 1), and add a stock image of another Tesla vehicle, instead of taking and processing images of the actual vehicle. The provider system (such as provider system 130 depicted in FIG. 1) providing the vehicle listing service may collect the vehicle listing information from the dealership's listing system and create a listing in an associated database (such as database 150 depicted in FIG. 1). Alternatively or additionally, an employee of the dealership can use the listing system to communicate with provider system 130 to create a listing for storage in database 150.

User A may visit the dealership and view the vehicle on the lot. When a mobile device (such as mobile device 120 depicted in FIG. 1) associated with user A detects that user A is on the lot, an imaging device (such as imaging device 210 depicted in FIG. 2) of the mobile device can be triggered. Alternatively, user A may desire to learn more about the vehicle and may cause identification application 220 to run on mobile device 120. The user may image the vehicle while identification application 220 is running (e.g., in response to instructions displayed on screen 230 by identification application 220). The identification application 220 may determine a vehicle identifier based on the captured image. For example, the identification application may determine the vehicle identifier to be "Red Tesla Model S 2018." The mobile device can send the vehicle identifier and the captured image to the provider system. The mobile device can also send a location information indicating a location of the vehicle to the provider system. In response, the user may receive information about the vehicle that can be displayed on the mobile device.

Based on the received identifier and the location information, the provider system can obtain the corresponding existing listing from the database. The provider system may determine a quality score of the received image from the mobile device and an existing listing image, and determine that the quality score of the received image is higher than the existing listing image. The provider system can update the existing listing with the received image, so that the update listing now includes an actual, recently-captured image of the listed vehicle. The added image can further include a location and/or time stamp indicating where and when the image was captured. The provider system can store the updated listing in the database, which can also be shared with or pushed to the dealership's listing system. Therefore, the dealership's listing can be updated. Further, when another user, user B, browses the listing system of the dealership or a website associated with the provider system, user B can view the updated listing with the added image.

As would be appreciated by one of skill in the art, the particular order and arrangement of steps disclosed in FIG. 5 is not intended to be limiting. For example, steps can be re-arranged or combined without departing from the envisioned embodiments. Steps can be divided into sub-steps that can be performed in a different order, or by other components of system 100. Furthermore, additional steps may be added or steps may be removed without departing from the envisioned embodiments.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims. Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above-described examples, but instead are defined by the appended claims in light of their full scope of equivalents.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

What is claimed is:

1. A system comprising:
   at least one processor; and
   at least one non-transitory computer-readable medium containing instructions that, when executed by the at least one processor, cause the system to perform operations comprising:
   communicating with a listing system to update a listing for a vehicle, wherein the listing includes a listing image of the vehicle;
   receiving, from an identification application executing on a mobile device distinct from the listing system, an image of the vehicle and location information of the mobile device;
   identifying the listing using the received location information;
   updating the listing for the vehicle, based on an age of the listing meeting a predetermined threshold, to include a view of the received image that is different from a view of the listing image; and
   providing the updated listing to a user in response to a query;
   wherein the identification application is configured to assess a quality of the listing and received images via an object detection model by generating a quality score based on one or more parameters comprising at least one of:
   a degree of focus of the received image;
   a degree of brightness of the received image; or
   a degree of contrast of the received image;
   wherein determining the one or more parameters associated with the image quality for the received image comprises determining a degree of obstruction of the vehicle in the received image, the determining the degree of obstruction further comprising using the object detection model based on a neural network architecture applied to the received image to detect a presence of obstructions;
   wherein the neural network architecture divides the received image into a plurality of regions, predicts bounding boxes and probabilities of each region, and weighs the bounding boxes by the predicted probabilities, wherein the bounding boxes bound the vehicle and the obstructions such that the object detection model detects the degree of obstruction.

2. The system of claim 1, wherein:
   identifying the listing using the received location information comprises:
   identifying a location using the received location information; and
   obtaining listings associated with the identified location, the listings including identifiers of vehicles.

3. The system of claim 1, wherein receiving the image of the vehicle comprises receiving video data including the image of the vehicle.

4. The system of claim 1, wherein the operations further comprise:
  generating a timestamp: and
  associating the timestamp with the updated listing.

5. A system comprising:
  at least one processor; and
  at least one non-transitory computer-readable medium containing instructions that, when executed by the at least one processor, cause the system to perform operations comprising:
    communicating with a listing system associated with a listing for a vehicle, wherein the listing includes a listing image of the vehicle;
    receiving, from an identification application executing on a mobile device distinct from the listing system, an image of the vehicle and location information of the mobile device;
    identifying the listing of the vehicle in the listing system using the received location information;
    updating the listing based on an age of the listing meeting a predetermined threshold; and
    providing the updated listing to a user in response to a query;
    wherein the identification application is configured to include a neural network architecture that assesses a quality of the listing and received images via an object detection model by generating a quality score based on one or more parameters comprising at least one of:
      a degree of focus of the received image;
      a degree of brightness of the received image; or
      a degree of contrast of the received image;
    wherein determining the one or more parameters associated with the image quality for the received image comprises determining a degree of obstruction of the vehicle in the received image, the determining the degree of obstruction further comprising using the object detection model based on a neural network architecture applied to the received image to detect a presence of obstructions;
    wherein the neural network architecture divides the received image into a plurality of regions, predicts bounding boxes and probabilities of each region, and weighs the bounding boxes by the predicted probabilities, wherein the bounding boxes bound the vehicle and the obstructions such that the object detection model detects the degree of obstruction.

6. The system of claim 5, wherein:
  identifying the listing using the received location information comprises:
    identifying a location using the received location information; and
    obtaining listings associated with the identified location, the listings including identifiers of vehicles.

7. The system of claim 5, wherein the operations further comprise:
  generating a timestamp; and
  associating the timestamp with the updated listing.

8. A system comprising:
  a mobile device configured to:
    acquire an image of a vehicle;
    generate an identifier for the vehicle using the acquired image; and
    provide the identifier for the vehicle and the acquired image to a provider system;
  wherein the provider system is configured to:
    communicate with a listing system associated with a listing for the vehicle, wherein the listing includes a listing image of the vehicle and the listing system is distinct from the mobile device;
    receive the acquired image from the mobile device and location information of the mobile device;
    receive the listing for the vehicle from the listing system using the received location information;
    update the listing for the vehicle, based on an age of the listing meeting a predetermined threshold, to include a view of the acquired image that is different from a view of the listing image; and
    provide the updated listing to a user in response to a query;
  wherein the provider system includes an identification application that is configured to assess a quality of the listing and acquired images via an object detection model by generating a quality score based on one or more parameters comprising at least one of:
    a degree of focus of the received image;
    a degree of brightness of the received image; or
    a degree of contrast of the received image;
  wherein determining the one or more parameters associated with the image quality for the received image comprises determining a degree of obstruction of the vehicle in the received image, the determining the degree of obstruction further comprising using the object detection model based on a neural network architecture applied to the received image to detect a presence of obstructions;
  wherein the neural network architecture divides the received image into a plurality of regions, predicts bounding boxes and probabilities of each region, and weighs the bounding boxes by the predicted probabilities, wherein the bounding boxes bound the vehicle and the obstructions such that the object detection model detects the degree of obstruction.

9. The system of claim 1, wherein the degree of focus is determined by Laplacian methods.

10. The system of claim 5, wherein the degree of focus is determined by Laplacian methods.

11. The system of claim 8, wherein the degree of focus is determined by Laplacian methods.

12. The system of claim 1, wherein the degree of focus is determined by Fourier Transform.

13. The system of claim 5, wherein the degree of focus is determined by Fourier Transform.

14. The system of claim 8, wherein the degree of focus is determined by Fourier Transform.

15. The system of claim 1, wherein the degree of brightness is determined by generating a mean or root mean square of a grey-scaled version of the received image.

16. The system of claim 5, wherein the degree of brightness is determined by generating a mean or root mean square of a grey-scaled version of the received image.

17. The system of claim 8, wherein the degree of brightness is determined by generating a mean or root mean square of a grey-scaled version of the received image.

18. The system of claim 1, wherein the degree of brightness is determined by converting the received image to a hue/saturation/value color model or a hue/saturation/lightness color model.

* * * * *